(12) United States Patent
Qu et al.

(10) Patent No.: US 7,397,773 B2
(45) Date of Patent: *Jul. 8, 2008

(54) GSM CELL BROADCAST SMS MESSAGE TRANSMISSION IN CDMA COMMUNICATION SYSTEMS

(75) Inventors: Hai Qu, San Diego, CA (US); Nobuyuki Uchida, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1155 days.

This patent is subject to a terminal disclaimer.

(21) Appl. No.: 10/278,443

(22) Filed: Oct. 22, 2002

(65) Prior Publication Data

US 2004/0076126 A1 Apr. 22, 2004

(51) Int. Cl.
*H04B 7/216* (2006.01)
(52) U.S. Cl. ........................ 370/320; 370/312
(58) Field of Classification Search ................ 370/389, 370/349, 320, 335, 342, 312, 392; 455/466, 455/419
See application file for complete search history.

(56) References Cited

U.S. PATENT DOCUMENTS

| | | | |
|---|---|---|---|
| 6,320,873 B1 | 11/2001 | Novo et al. | 370/466 |
| 6,493,559 B1* | 12/2002 | Pecen et al. | 455/466 |
| 7,072,359 B2* | 7/2006 | Uchida et al. | 370/466 |
| 7,082,313 B2* | 7/2006 | Sabo et al. | 455/466 |
| 2003/0013466 A1* | 1/2003 | Ahn | 455/466 |
| 2003/0139175 A1* | 7/2003 | Kim | 455/419 |
| 2003/0224811 A1* | 12/2003 | Jain et al. | 455/466 |
| 2004/0038691 A1* | 2/2004 | Shin | 455/466 |

FOREIGN PATENT DOCUMENTS

EP 1223781 1/2002

OTHER PUBLICATIONS

Tscha Y et al. *A subscriber signaling gateway between CDMA Mobile station and GSM Mobile switching Center* International Conference on Universal Personal Communications, IEEE, New York, NY US; vol. 1, Oct. 12, 1993, pp. 181-185.
*Network Interworking between GSM MAP And TIA/EIA-41 MAP, Revision A-GPRS Support*, vol. 2—*Information Flows* Interim Standard (Trial Use Standard), TAI, IS-J-STD-038-A, vol. 2, Jan. 2002, pp. 114-133.

* cited by examiner

*Primary Examiner*—Brenda Pham
(74) *Attorney, Agent, or Firm*—Kent Baker; Roberta A. Young; Thomas Rouse

(57) ABSTRACT

Techniques to send GSM CBS messages over a CDMA air interface. The encapsulation of a GSM CBS message in CDMA messages may be achieved using various schemes. An indication is provided at each of a number of pertinent layers to allow the terminals to determine whether a GSM CBS message or a CDMA broadcast SMS message was sent. These indications include (1) a value in a designated field or subfield of a Data Burst Message, (2) a new value for a Category field in a Service Category parameter of an SMS Broadcast Message, and (3) a new value for a Msg_Encoding field in a User Data subparameter of the SMS Deliver Message.

20 Claims, 11 Drawing Sheets

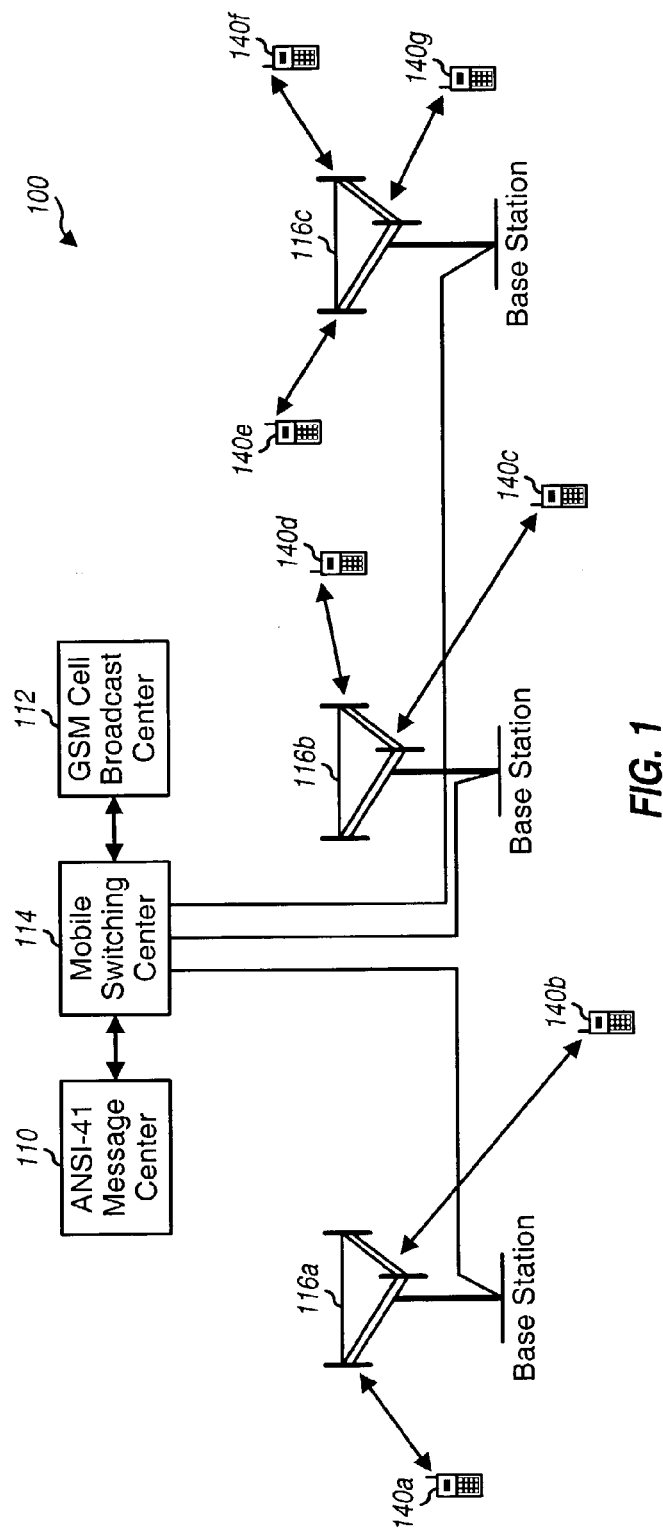

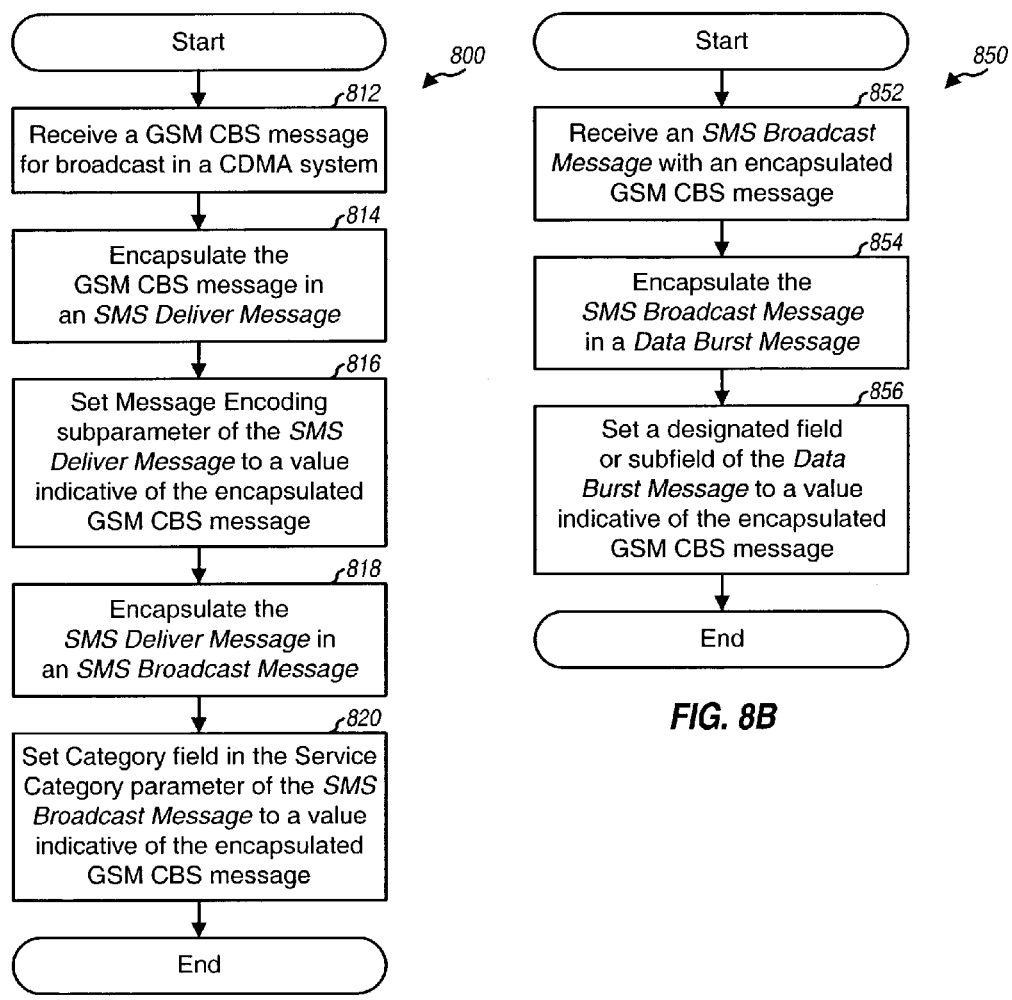

GSM CELL BROADCAST SMS MESSAGE TRANSMISSION IN CDMA COMMUNICATION SYSTEMS

BACKGROUND

I. Field

The present invention relates generally to data communication, and more specifically to techniques for sending GSM cell broadcast SMS messages in CDMA communication systems.

II. Background

Short Message Service (SMS) is a service that supports the exchange of SMS or short messages between terminals (e.g., cellular phones) and a wireless communication system. These short messages may be point-to-point messages intended for specific terminals or broadcast messages intended for multiple terminals.

SMS may be implemented by various types of wireless communication systems, two of which are code division multiple access (CDMA) systems and time division multiple access (TDMA) systems. A CDMA system may be designed to implement one or more standards such as IS-2000, W-CDMA, IS-95, and so on. A TDMA system may also be designed to implement one or more standards such as Global System for Mobile Communications (GSM). A CDMA system that implements IS-2000 is often referred to as a cdma2000 system.

A network typically refers to a deployment of a system. A CDMA network utilizes a CDMA air interface (e.g., IS-2000, W-CDMA, or IS-95), and a GSM network utilizes a GSM air interface. A network typically further implements a particular mobile networking protocol that allows for roaming and advanced services, with ANSI-41 being commonly used for CDMA networks (except for W-CDMA) and GSM Mobile Application Part (GSM-MAP) being used for GSM and W-CDMA networks. A GSM1x network utilizes a CDMA air interface and implements GSM-MAP, and may be considered as both a CDMA network and a GSM-MAP network.

SMS is network technology dependent, and two SMS implementations have been defined for ANSI-41 and GSM-MAP. Each SMS implementation has different capabilities and utilizes different message types and formats for sending SMS messages. A communication network normally supports either of the two SMS implementations, depending on the underlying network technology. The SMS implementation for ANSI-41 networks is described in TIA/EIA-637-B, entitled "Short Message Service for Wideband Spread Spectrum Systems." The SMS implementation for GSM-MAP networks is described in documents 3GPP TS 23.038 and TS 23.040. GSM point-to-point (PP) SMS procedures for the terminals are described in GSM 03.40 and 04.11, and GSM cell broadcast SMS procedures for the terminals are described in GSM 03.41 and 04.12. These documents are publicly available and incorporated herein by reference. For simplicity, the SMS implementation for GSM-MAP is referred to as GSM SMS, and the SMS implementation for ANSI-41 is referred to as CDMA SMS.

Although CDMA and GSM are quite different in design, an interworking and interoperability function (IIF) has been defined to allow for communication between these two different types of networks. The result is that improved coverage and performance may be attained for users of the networks. Through the IIF, a GSM mobile user may roam into the coverage area of a CDMA network and can continue to receive service, and vice versa.

A GSM-MAP network may be designed to provide Cell Broadcast SMS (CBS) service. This service periodically broadcast GSM CBS messages to terminals within designated geographic areas. The GSM CBS messages can carry various types of information such as road traffic information, weather information, and so on. Each GSM CBS message includes one or more CBS pages, and each CBS page includes various fields for various attributes of the message. These fields may be used to filter the messages, so that the users can selectively receive only desired messages and filter out undesired ones.

For GSM1x networks and CDMA ANSI-41 networks that interwork with GSM-MAP networks, it is desirable to send GSM CBS messages to terminals over the CDMA air interface. This would then allow the terminals to receive CBS service. However, because the implementations for CDMA SMS and GSM SMS are different, the GSM CBS message and the broadcast message in CDMA SMS have different formats.

There is therefore a need in the art for techniques to send GSM CBS messages in CDMA communication systems.

SUMMARY

Techniques are provided herein to send GSM CBS messages over a CDMA air interface. These techniques allow CDMA, GSM1x, and multi-mode terminals to receive CBS service offered by a GSM-MAP network and to identify and filter GSM CBS messages.

The encapsulation of a GSM CBS message in CDMA messages may be achieved using various schemes described herein. An indication is provided at each of a number of pertinent layers to allow the terminals to determine whether a GSM CBS message or a CDMA broadcast SMS message was sent. These indications include (1) a value in a designated field or subfield of a Data Burst Message, which is one of the messages for Layer 3 in IS-2000 and IS-95, (2) a new value for a Category field in a Service Category parameter of an SMS Broadcast Message, which is one of the messages for a Transport Layer in CDMA SMS, and (3) a new value for a Msg_Encoding field in a User Data subparameter of the SMS Deliver Message, which is one of the messages for a Teleservice Layer in CDMA SMS.

Various aspects and embodiments of the invention are described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein:

FIG. 1 is a diagram of a communication network that supports CDMA SMS and can also send GSM CBS messages;

FIG. 2A shows the format of a GSM CBS message used by GSM SMS for CBS service;

FIGS. 8A and 8B show processes for encapsulating a GSM CBS message in a CDMA SMS message and further in a Data Burst Message;

DETAILED DESCRIPTION

Figure 2B:
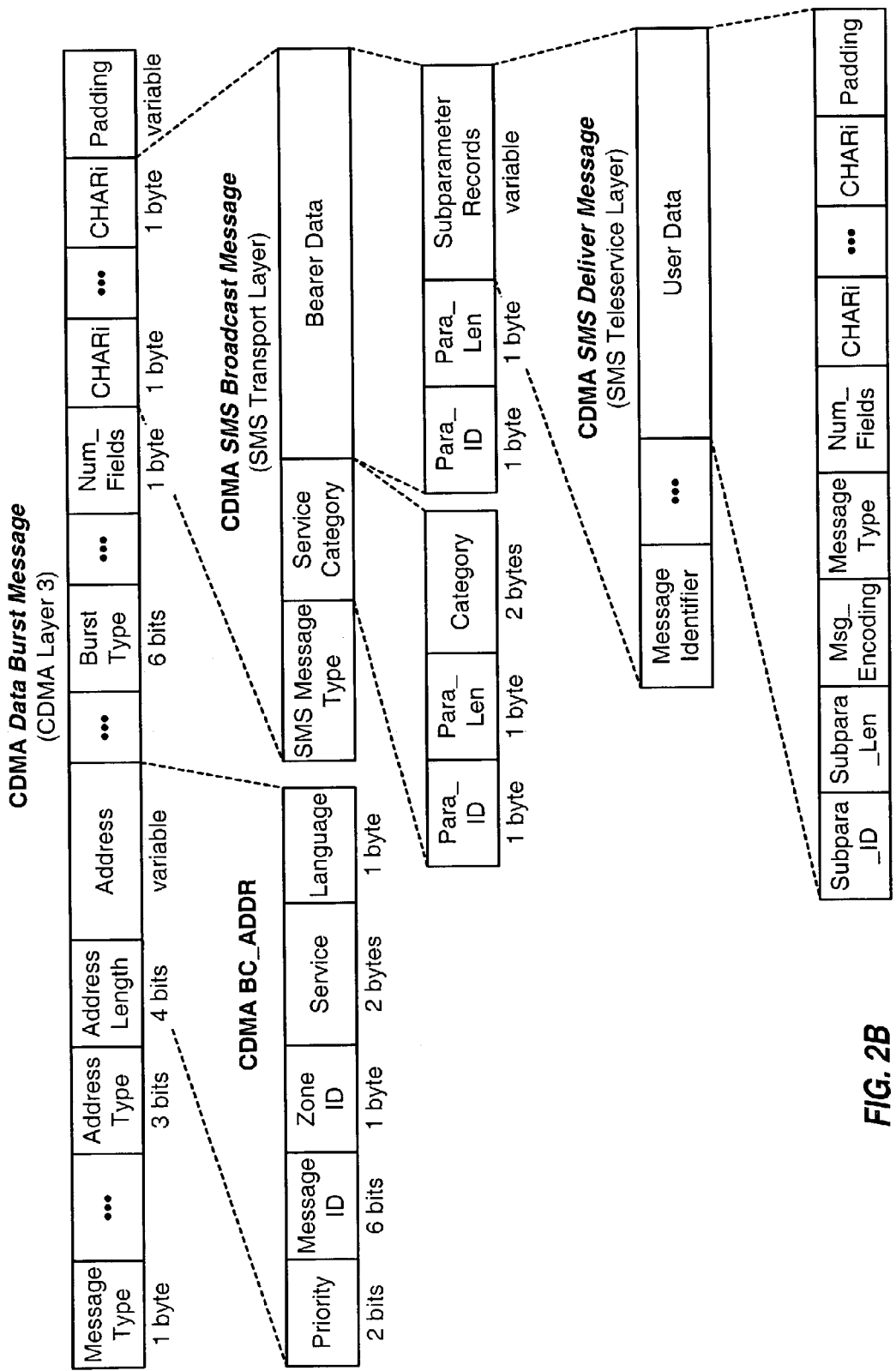
FIG. 2B shows the formats of various messages used to send broadcast SMS messages in a CDMA system.

FIG. 1 is a diagram of a communication network 100 that supports CDMA SMS and can also send GSM CBS messages. Network 100 includes an ANSI-41 message center 110, a GSM cell broadcast center (CBC) 112, a mobile switching center (MSC) 114, and base stations 116. These network entities collectively serve a number of terminals 140. The ANSI-41 message center, MSC, and base stations may be part of a CDMA ANSI-41 network, and the cell broadcast center may be part of a GSM-MAP network. Network 100 utilizes a CDMA air interface (e.g., IS-2000, W-CDMA, or IS-95) for communication between the base stations and terminals, and may thus be referred to as a CDMA network.

Message center 110 and cell broadcast center 112 are responsible for storing, relaying, and forwarding SMS messages for terminals in ANSI-41 and GSM-MAP networks, respectively. MSC 114 performs switching functions (i.e., routing of messages and data) for the terminals within its coverage area. MSC 114 couples to a number of base stations and controls the communication for the terminals under the coverage of these base stations. In the example shown in FIG. 1, message center 110 communicates with MSC 114 to support CDMA SMS, and cell broadcast center 112 also communicates with MSC 114 to support GSM SMS. In general, message center 110 may be implemented separate from or integrated with the MSC. Cell broadcast center 112 may communicate with MSC 114 via other network entities that are not shown in FIG. 1 for simplicity. Network 100 may also include multiple message centers, cell broadcast centers, and/or MSCs.

Base stations 116 are fixed stations used for communicating with terminals 140. Each base station communicates with the terminals under its coverage area to support SMS and provide other services (e.g., voice, packet data, and so on). Each terminal may communicate with one or more base stations at any given moment, depending on whether or not it is active and whether or not soft handoff is supported. A terminal is also referred to as a mobile station, a remote station, a mobile equipment (ME), a user equipment (UE), a cellular phone, a handset, or some other terminology.

As noted above, SMS is network technology dependent and two SMS implementations have been defined for ANSI-41 and GSM-MAP. Each SMS implementation has different capabilities and utilizes different message types and formats for sending SMS messages.

FIG. 2A shows the format of a GSM CBS message used by GSM SMS for CBS service. On the network side, a CBS message may include up to 15 CBS pages, and each CBS page comprises a fixed block of 88 octets. The cell broadcast center can thus generate up to 15 CBS pages for a long multi-page CBS message. Each CBS page is transmitted as a GSM CBS message over the air. For simplicity, the following description refers to the over-the-air GSM CBS message, which includes only one CBS page. The GSM CBS message includes five parameters, which are shown in FIG. 2A and described in Table 1.

TABLE 1

| Parameter | Length (bytes) | Description |
| --- | --- | --- |
| Serial Number | 2 | Include the serial number and zone information for the CBS message. |
| Message Identifier | 2 | Identify the source and type (or service category) of the CBS message. |
| Data Coding Scheme (DCS) | 1 | Indicate the processing parameters for the CBS message (e.g., the alphabet, coding, and language). |
| Page Parameter | 1 | Indicate the number of CBS pages in the CBS message and the specific page within the message. |
| Content of Message | 82 | Contain data for the CBS message (a copy of the "CBS-Message-Information-Page" sent to the base station). |

The GSM CBS message may also be viewed as comprising a header portion and a data portion. The header portion would include the Serial Number, Message Identifier, DCS, and Page Parameter fields. The data portion would include the Content field.

The GSM CBS message format is described in further detail in a document ETSI TS 123 041, which is publicly available and incorporated herein by reference.

FIG. 2B shows the formats of various messages used for sending broadcast SMS messages in a CDMA system. For CDMA SMS, the protocol stack includes four layers, which are:

SMS Teleservice Layer—provides application-level data formats and procedures,

SMS Transport Layer—manages end-to-end delivery of SMS messages,

SMS Relay Layer—provides the interface between the Transport Layer and the Link Layer, and Link Layer—performs message transmission.

For CDMA SMS, data to be broadcasted by a message center to the terminals is first encapsulated in an SMS Deliver Message, which is a message at the Teleservice Layer. The SMS Deliver Message includes various fields that describe attributes of the message, and is further encapsulated in an SMS Broadcast Message, which is a message at the Transport Layer. The SMS Broadcast Message includes various fields used for transport related functions, and is further encapsulated in a Data Burst Message, which is a message at Layer 3 for IS-2000 and IS-95. This Data Burst Message is further processed and eventually transmitted to the terminals.

The SMS Deliver Message includes a number of subparameters used to convey various types of information for the message. Table 2 lists the subparameters of the SMS Deliver Message when used to send broadcast data.

TABLE 2

| Subparameter | Description |
| --- | --- |
| Message Identifier | Identify certain attributes of the message. |
| User Data | Carry user data for the message. |

The SMS Deliver Message may also include other subparameters used to convey other information for the message.

Table 3 lists various fields in the User Data subparameter of the SMS Deliver Message.

TABLE 3

| Field | Length | Description |
|---|---|---|
| Subparameter_ID | 8 bits | Set to "00000001" for the User Data subparameter. |
| Subparam_Len | 8 bits | Indicate the length of the User Data subparameter. |
| Msg_Encoding | 5 bits | Indicate the coding scheme used for the user data in the message. |
| Message_Type | 0 or 8 bits | Indicate the type of the message. |
| Num_Fields | 8 bits | Indicate the number of occurrences of the CHARi field. |
| Num_Fields occurrences of the following field: | | |
| CHARi | variable | Carry one character of the user data. |
| The User Data subparameter ends with the following field: | | |
| Padding | 0-7 bits | Include a sufficient number of bits to make the User Data subparameter an integer number of octets in length. |

The broadcast data is carried in the CHARi fields of the User Data subparameter.

The SMS Broadcast Message includes a number of parameters used to convey various types of information for the message. Table 4 lists the parameters of the SMS Broadcast Message.

TABLE 4

| Parameter | Description |
|---|---|
| SMS Message Type | Set to "00000001" for SMS Broadcast Message. |
| Service Category | Identify the type of service supported by the broadcast message. |
| Bearer Data | Carry the SMS Deliver Message. |

The Service Category parameter includes a number of fields, one of which is a Category field. This Category field contains a 16-bit value indicative of the specific service category associated with the broadcast SMS message. The Bearer Data parameter also includes a number of fields, including subparameter records that may be used to carry the SMS Deliver Message.

Each SMS Broadcast Message is associated with a BC_ADDR that includes fields for various attributes of the message. Table 5 lists the fields of the BC_ADDR.

TABLE 5

| Parameter | Length (bits) | Description |
|---|---|---|
| Priority | 2 | Indicate the priority of the broadcast message. |
| Message ID | 6 | Use to distinguish different messages for the same broadcast service. |
| Zone ID | 8 | Indicate the zone for which the message is to be sent. |
| Service | 16 | Indicate the service associated the message. |
| Language | 8 | Indicate the language used for the message. |

The Data Burst Message may be used to send data for various applications and services. Table 6 lists some of the fields of the Data Burst Message that are pertinent for broadcast SMS.

TABLE 6

| Field | Length | Description |
|---|---|---|
| Message Type | 8 bits | Set to "00001001" for the Data Burst Message. |
| Address Type | 3 bits | Indicate the type of address to be received for the message. |
| Address Length | 4 bits | Indicate the length of the Address field (in bytes). |
| Address | variable | Carry the address for the message. |
| Burst Type | 6 bits | Indicate the type of service being sent in the message. |
| Num_Fields | 8 bits | Indicate the number of occurrences of the CHARi field. |
| Num_Fields occurrences of the following field: | | |
| CHARi | 8 bits | Carry one 8-bit character of user data. |
| The Data Burst Message ends with the following field: | | |
| Padding | 0-7 bits | Include a sufficient number of bits to make the message an integer number of octets in length. |

The Data Burst Message includes other fields used to convey other information for the message, which are not listed in Table 6 or shown in FIG. 2B for simplicity. The SMS Broadcast Message may be carried in the CHARi fields of the Data Burst Message, as shown in FIG. 2B. The BC_ADDR for the SMS Broadcast Message is carried in the Address field of the Data Burst Message.

The SMS Deliver Message, SMS Broadcast Message, and BC_ADDR are described in further detail in the aforementioned TIA/EIA-637-B. The Data Burst Message for IS-95 is described in a document entitled "TIA/EIA/IS-95-B Mobile Station-Base Station Compatibility Standard for Wideband Spread Spectrum Cellular Systems," which is publicly available and incorporated herein by reference.

As noted above, for GSM1x networks and CDMA ANSI-41 networks that interwork with GSM-MAP networks, it is desirable to send GSM CBS messages to terminals over the CDMA air interface. However, as shown in FIGS. 2A and 2B, the format of the GSM CBS message is different from the formats of the messages used for broadcast SMS in a CDMA network.

Techniques are provided herein to send GSM CBS messages over a CDMA air interface. These techniques allow CDMA, GSM1x, and multi-mode terminals (which are collectively referred to as CDMA terminals) to receive CBS service offered by a GSM-MAP network. These techniques also allow the CDMA terminals to identify and filter GSM CBS messages. The original content of the GSM CBS messages can be delivered to the terminals using the techniques described herein.

As shown in FIGS. 2A and 2B, the BC_ADDR for a CDMA SMS message has a length of 5 bytes and the header portion of a GSM CBS message has a length of 6 bytes. These two kinds of addresses can be accommodated in a manner such that they can be used by the terminals to differentiate between a GSM CBS message and a CDMA broadcast SMS message. The encapsulation of a GSM CBS message in CDMA messages may be achieved using various schemes, a number of which are described below.

Figure 3:
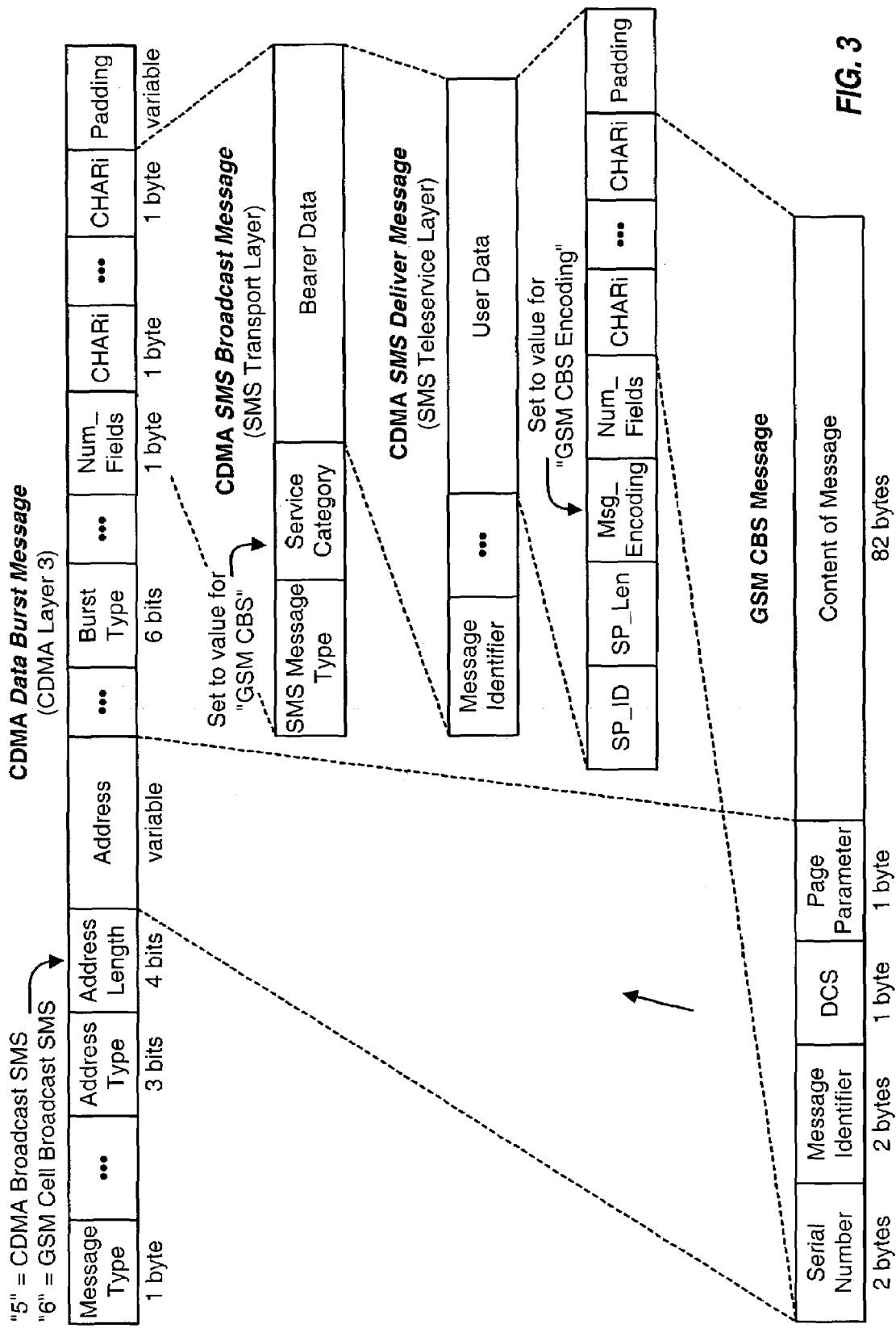
FIGS. 3 through 6 show four schemes for encapsulating a GSM CBS messages for transmission over a CDMA air interface using (1) the length of an Address field in a Data Burst Message, (2) a subfield of the Address field, (3) a new value for a Burst Type field in the Data Burst Message, and (4) the value for a Language field for BC_ADDR, respectively, to differentiate between CDMA broadcast SMS and GSM CBS.

FIG. 3 shows a first scheme for encapsulating a GSM CBS message for transmission over the CDMA air interface, which uses the length of the Address field in the Data Burst Message to differentiate between CDMA broadcast SMS and GSM CBS. The length of the Address field is variable and includes $N_{addr}$ bytes, where $N_{addr}$ is the value in the Address Length field. For this scheme, the Address Length field can be set to "5" for a CDMA broadcast SMS message and to "6" for a GSM CBS message.

For the first scheme, the GSM CBS message can be carried by the Data Burst Message by performing the following:
  Include the entire 6-byte header portion of the GSM CBS message in the Address field of the Data Burst Message,
  Set the Address Length field of the Data Burst Message to "6",
  Include the entire GSM CBS message in the CHARi fields in the User Subparameter of the SMS Deliver Message,
  Set the Msg_Encoding field in the User Data subparameter to a value for "GSM CBS Encoding", and
  Set the Category field in the Service Category parameter of the SMS Broadcast Message to a value for "GSM CBS".

The Category field contains a 16-bit value indicative of the specific service category associated with the SMS Broadcast Message. A number of standard and proprietary service categories are currently defined by TIA/EIA-637-B and given in TSB-58-E, entitled "Administration of Parameter Value Assignments for cdma2000 Spread Spectrum Standards," which is publicly available and incorporated herein by reference. The standard and proprietary service categories are assigned Category values of "0x0000" through "0x001F" and "0x8001" through "0xFFFF", respectively, whe "0x" denotes a hexadecimal number. A new Category value may be defined for "GSM CBS" and may be set to any value that has not already been assigned to a currently defined service category (e.g., "0x0020"). This new Category value may be used to indicate that a GSM CBS message is being carried by the SMS Broadcast Message.

The Msg_Encoding (or Message Encoding) field contains a 5-bit value indicative of the specific coding scheme used for the data sent in the CHARi fields in the User Data subparameter of the SMS Deliver Message. A number of encoding types are currently defined and are assigned values of "00000" through "01001", as given in TSB-58-E. A new Msg_Encoding value (e.g., "01010") may be defined for "GSM CBS Encoding" and may be used to indicate that a GSM CBS message is being carried in the SMS Deliver Message.

As shown in FIG. 3, the GSM CBS message can be encapsulated in CDMA messages for transmission over the CDMA air interface to CDMA terminals. Moreover, an indication is provided at each layer to allow the terminals to determine whether a GSM CBS message or a CDMA broadcast SMS message was sent. These indications include three new values for the Address Length field in the Data Burst Message, the Category field in the Service Category parameter of the SMS Broadcast Message, and the Msg_Encoding field in the User Data subparameter of the SMS Deliver Message.

Figure 4:
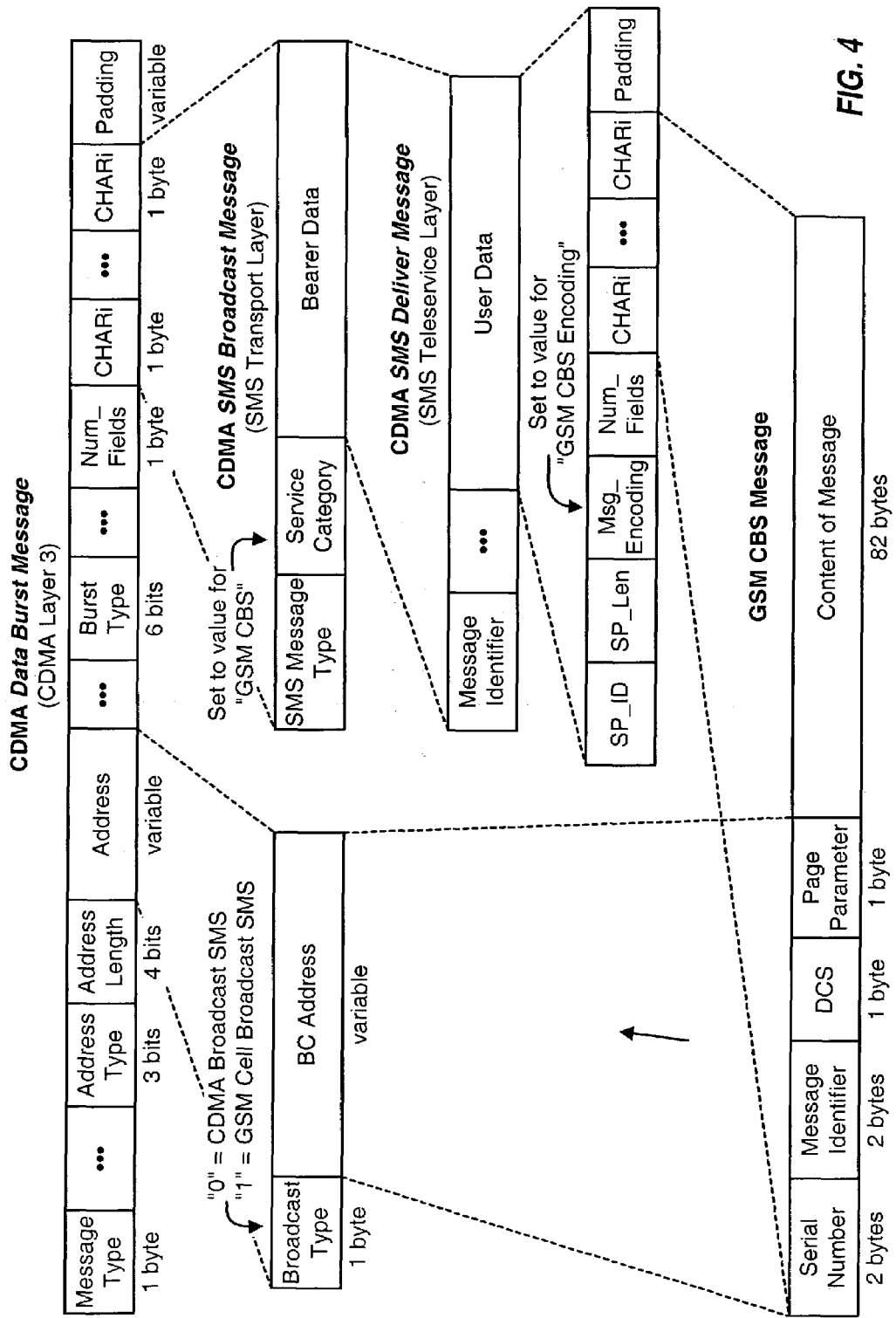

FIG. 4 shows a second scheme for encapsulating a GSM CBS message for transmission over the CDMA air interface, which uses a subfield in the Address field of the Data Burst Message to differentiate between CDMA broadcast SMS and GSM CBS. For this scheme, the Address field may be defined to include two subfields: a Broadcast Type subfield and a BC Address subfield. The Broadcast Type subfield may be used to indicate the type of broadcast being sent and may be defined, for example, with values of "0x00" for CDMA broadcast SMS and "0x01" for GSM CBS. The BC Address subfield is variable in length and, depending on the value in the Broadcast Type subfield, can carry the 5-byte BC_ADDR for CDMA broadcast SMS or the 6-byte header portion of a GSM CBS message for GSM CBS.

Similar to the first scheme, the Msg_Encoding field in the User Data subparameter of the SMS Deliver Message may be set to the value for "GSM CBS Encoding", and the Category field in the Service Category parameter of the SMS Broadcast Message may be set to the value for "GSM CBS".

Figure 5:
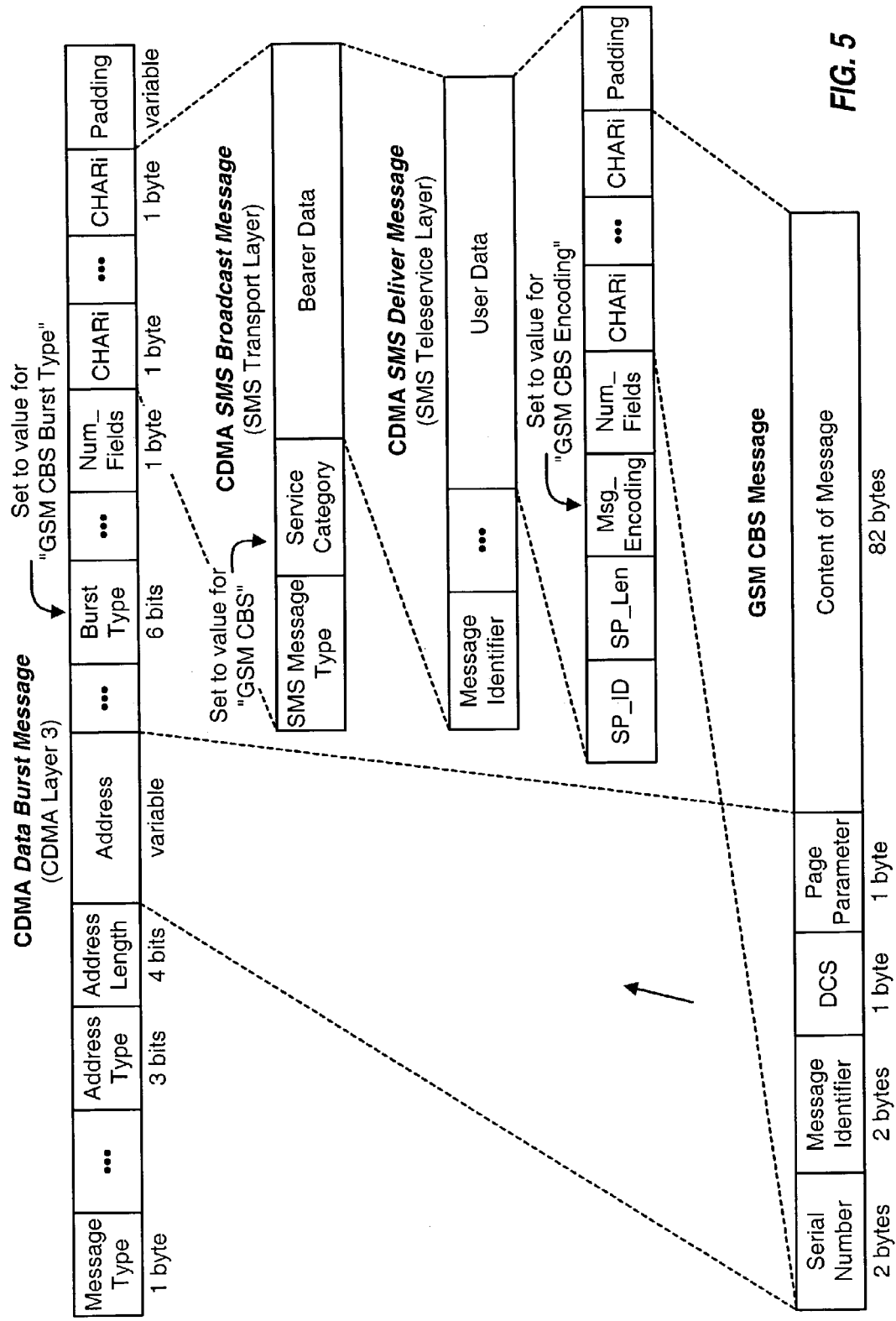

FIG. 5 shows a third scheme for encapsulating a GSM CBS message for transmission over the CDMA air interface, which uses a new value for the Burst Type field in the Data Burst Message to differentiate between CDMA broadcast SMS and GSM CBS. The Burst Type field contains a 6-bit value indicative of the application associated with the Data Burst Message. A number of burst types are currently defined by IS-95 and given in the aforementioned IS-95 document. A new Burst Type value may be defined for "GSM CBS Burst Type" and may be set to any value that has not already been assigned to a currently defined burst type (e.g., "001000"). This new Burst Type value may be used to indicate that a GSM CBS message is being carried in the Data Burst Message.

As shown in FIG. 5, for the third scheme, the entire 6-byte header portion of the GSM CBS message can be carried in the Address field of the Data Burst Message and the entire GSM CBS message can be carried in the CHARi fields in the User Data subparameter of the SMS Deliver Message. Again, the Msg_Encoding field in the User Data subparameter may be set to the value for "GSM CBS Encoding", and the Category field in the Service Category parameter of the SMS Broadcast Message may be set to the value for "GSM CBS".

Figure 6:
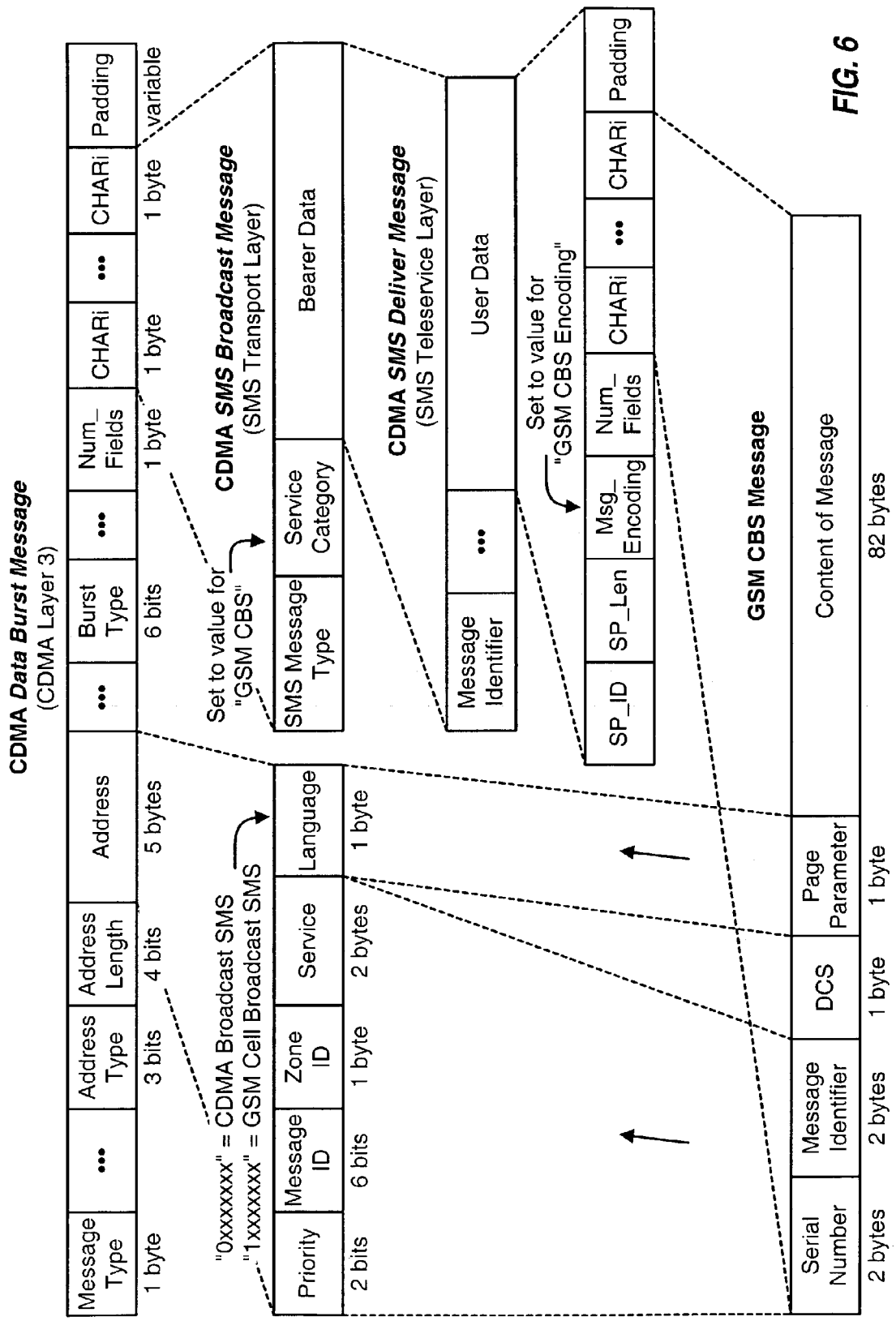

FIG. 6 shows a fourth scheme for encapsulating a GSM CBS message for transmission over the CDMA air interface, which uses the value in the Language field of the BC_ADDR to differentiate between CDMA broadcast SMS and GSM CBS. For this scheme, a partial 5-byte header portion of a GSM CBS message is mapped to the BC_ADDR. For the embodiment shown in FIG. 6, the following mapping is made:
  Serial Number parameter of the GSM CBS message is mapped to the combined Priority, Message ID, and Zone ID fields of the BC_ADDR,
  Message Identifier parameter of the GSM CBS message is mapped to the Service field of the BC_ADDR, and
  Page Parameter of the GSM CBS message is mapped to the Language field of the BC_ADDR.

The DCS field of the GSM CBS message is not carried in the BC_ADDR.

The Language field of the BC_ADDR contains an 8-bit value indicative of the language used for a CDMA broadcast SMS message sent in the Data Burst Message. A set of languages is currently defined and assigned values of "00000000" through "00000111", as given in TSB-58-E. The remaining values for the Language field are currently available (i.e., not yet assigned).

The Page Parameter field of the GSM CBS message contains two 4-bits subfields concatenated together. The lesser significant (or lower) 4-bit subfield contains a value indicative of the total number of CBS pages in a given CBS message. The more significant (or upper) 4-bit subfield contains a value indicative of a specific page within the message. Up to 15 CBS pages may be included in a GSM CBS message, and the exact number of pages is indicated by the value in the lower 4-bit subfield. The value in the upper 4-bit subfield ranges from 1 to the value in the lower 4-bit subfield. The Page Parameter field is described in further detail in the aforementioned ETSI TS 123 041.

For the fourth scheme, the most significant bit (MSB) of the Language field is used to differentiate between CDMA broadcast SMS and GSM CBS. A value of "0x7F" or less for the Language field indicates that the Data Burst Message carries a CDMA broadcast SMS message, and a value of "0x80" or more indicates that a GSM CBS message is carried. For this scheme, the value for the Language field is limited to "0x7F" or less, and the number of CBS pages in a CBS message is limited to 7 or less (instead of 15 or less, as currently defined). The lower 4-bit subfield can then take on any value between 1 and 7, and the upper 4-bit subfield can also take on any value between 1 and 7. The MSB of the lower 4-bit subfield can be set to zero, and the MSB of the upper 4-bit subfield can be set to one. The Page Parameter would then have the following format: "1nnn0sss" where nnn represents the 3-bit value for the upper 4-bit subfield and sss represents the 3-bit value for the lower 4-bit subfield.

As shown in FIG. 6, for the fourth scheme, the entire GSM CBS message can be carried in the CHARi fields in the User Data subparameter of the SMS Deliver Message, the Msg_Encoding field of the User Data subparameter may be set to the value for "GSM CBS Encoding", and the Category field in the Service Category parameter of the SMS Broadcast Message may be set to the value for "GSM CBS".

In a fifth scheme for sending a GSM CBS message over the CDMA air interface, the network performs all of the conversions and makes the CDMA air interface transparent. The terminal then uses the same conversion algorithm (i.e., that the network uses) to perform inverse conversions on the broadcast services. For example, GSM Weather Forecast service can be mapped to CDMA Weather Forecast service. A GSM1x terminal can then behave like a traditional GSM terminal to the user. The user can receive GSM CBS messages and the SIM card can store them in GSM CBS format.

Figure 7A:
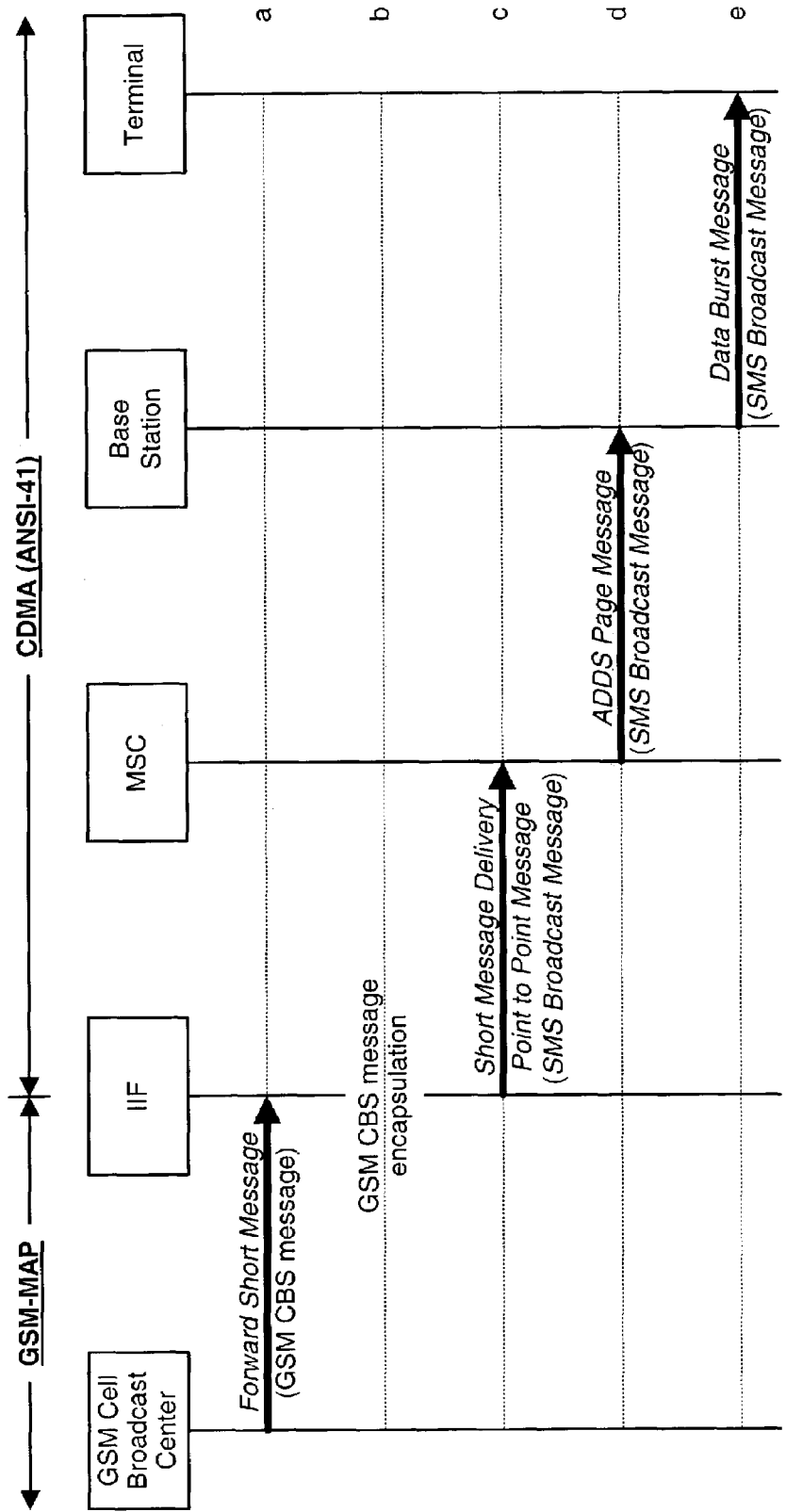
FIGS. 7A and 7B illustrate signal flows for sending a GSM CBS message in GSM-MAP/CDMA ANSI-41 networks and in a GSM1x network, respectively.

FIG. 7A illustrates the signal flow for sending a GSM CBS message from a GSM-MAP network to terminals in a CDMA ANSI-41 network. Initially, the cell broadcast center sends the GSM CBS message to the IIF using a Forward Short Message (transaction a). The IIF provides an interface for the cell broadcast center to an MSC that uses a foreign network signaling protocol (i.e., foreign to the cell broadcast center). The functionality provided by the IIF is described in detail in J-STD-038-A, entitled "Network Interworking Between GSM Map and TIA/EIA-41-Map—Revision A —GPRS Support," which is publicly available and incorporated herein by reference.

For this GSM CBS message, the IIF is seen by the cell broadcast center as a GSM MSC/VLR (visiting location register). Upon receiving the Forward Short Message from the cell broadcast center, the IIF encapsulates the GSM CBS message in an SMS Broadcast Message (step b). The result of the message encapsulation is a CDMA SMS message in the proper format and carrying the GSM CBS message. At this point, the IIF would then be acting as an ANSI-41 message center. The IIF then originates a Short Message Delivery Point to Point Message to send the SMS Broadcast Message to the MSC (transaction c). The MSC receives the message from the IIF and encapsulates the SMS Broadcast Message in an ADDR Transfer Message (which is subsequently used to form a Data Burst Message) using any one of the message encapsulation schemes described above. The ADDR Transfer Message is then sent to the base station (transaction d), which then forms the Data Burst Message and transmits it to the terminals (transaction e).

Figure 7B:
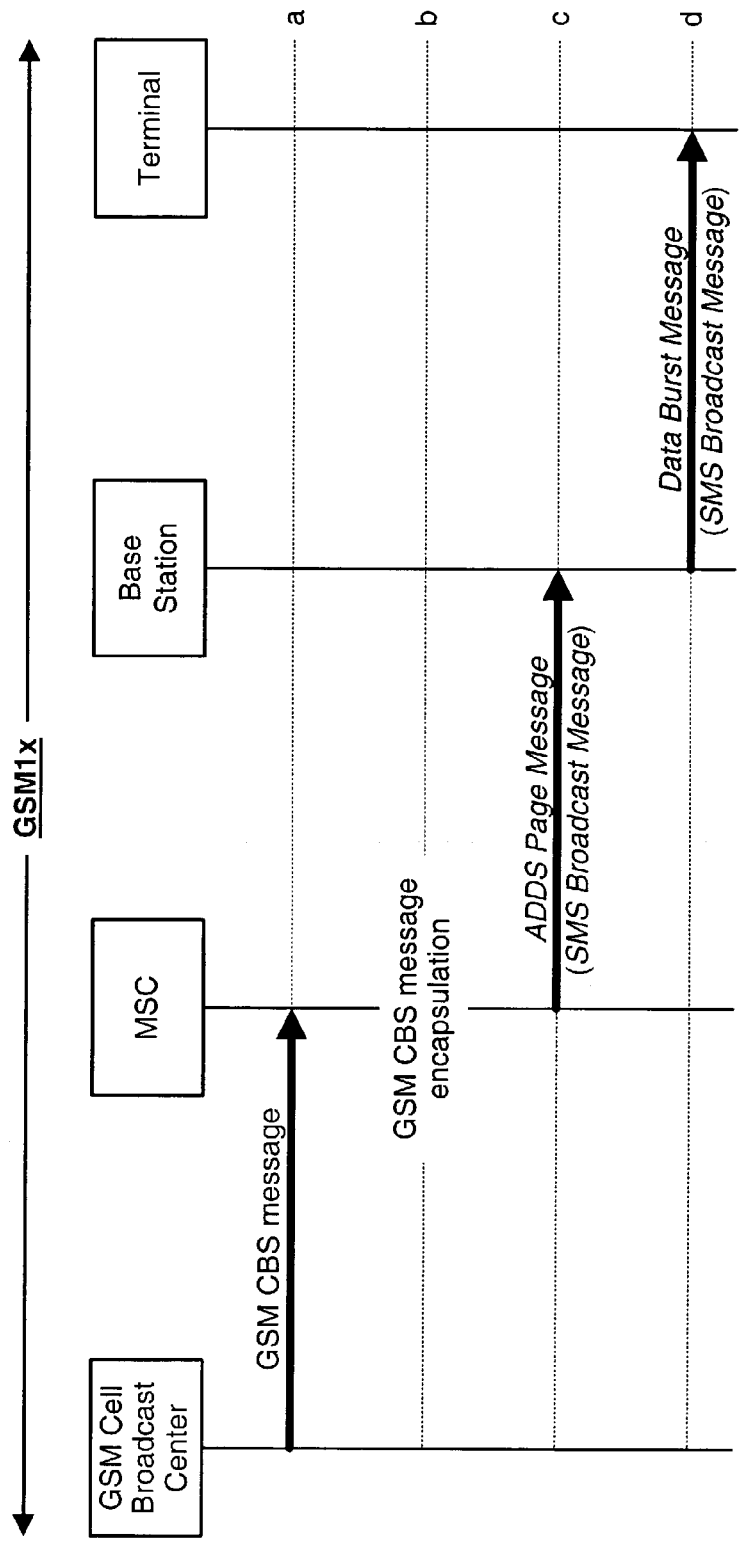

FIG. 7B illustrates the signal flow for sending a GSM CBS message from a GSM1x network to the terminals. Initially, the cell broadcast center sends the GSM CBS message to the MSC (transaction a). The MSC encapsulates the GSM CBS message in an SMS Broadcast Message (step b) and sends it to the base station using an ADDS Transfer Message (step c). The base station receives the message from the MSC, forms the Data Burst Message, and transmits it to the terminals (transaction d).

FIG. 8A is a flow diagram of an embodiment of a process 800 to encapsulate a GSM CBS message in a CDMA SMS message. Process 800 may be performed by an IIF or an MSC. The GSM CBS message to be broadcast in a CDMA network is initially received (step 812) and encapsulated in an SMS Deliver Message, as shown in FIGS. 3 through 6 (step 814) The Msg_Encoding field in the User Data subparameter of the SMS Deliver Message is set to a value ("GSM CBS Encoding") to indicate that the SMS Deliver Message carries the GSM CBS message (step 816). The SMS Deliver Message is further encapsulated in an SMS Broadcast Message, as also shown in FIGS. 3 through 6 (step 818). The Category field in the Service Category parameter of the SMS Broadcast Message is set to a value ("GSM CBS") indicative of the encapsulated GSM CBS message (step 820).

FIG. 8B is a flow diagram of an embodiment of a process 850 to encapsulate an SMS Broadcast Message in a Data Burst Message. Process 850 may be performed by the MSC or the base station. Initially, the SMS Broadcast Message with an encapsulated GSM CBS message is received (step 852). The SMS Broadcast Message is then encapsulated in a Data Burst Message (or an ADDS Transfer Message) based on any one of the encapsulation schemes described above (step 854). A designated field or subfield of the Data Burst Message is set to a value indicative of the encapsulated GSM CBS message (step 856).

Figure 9:
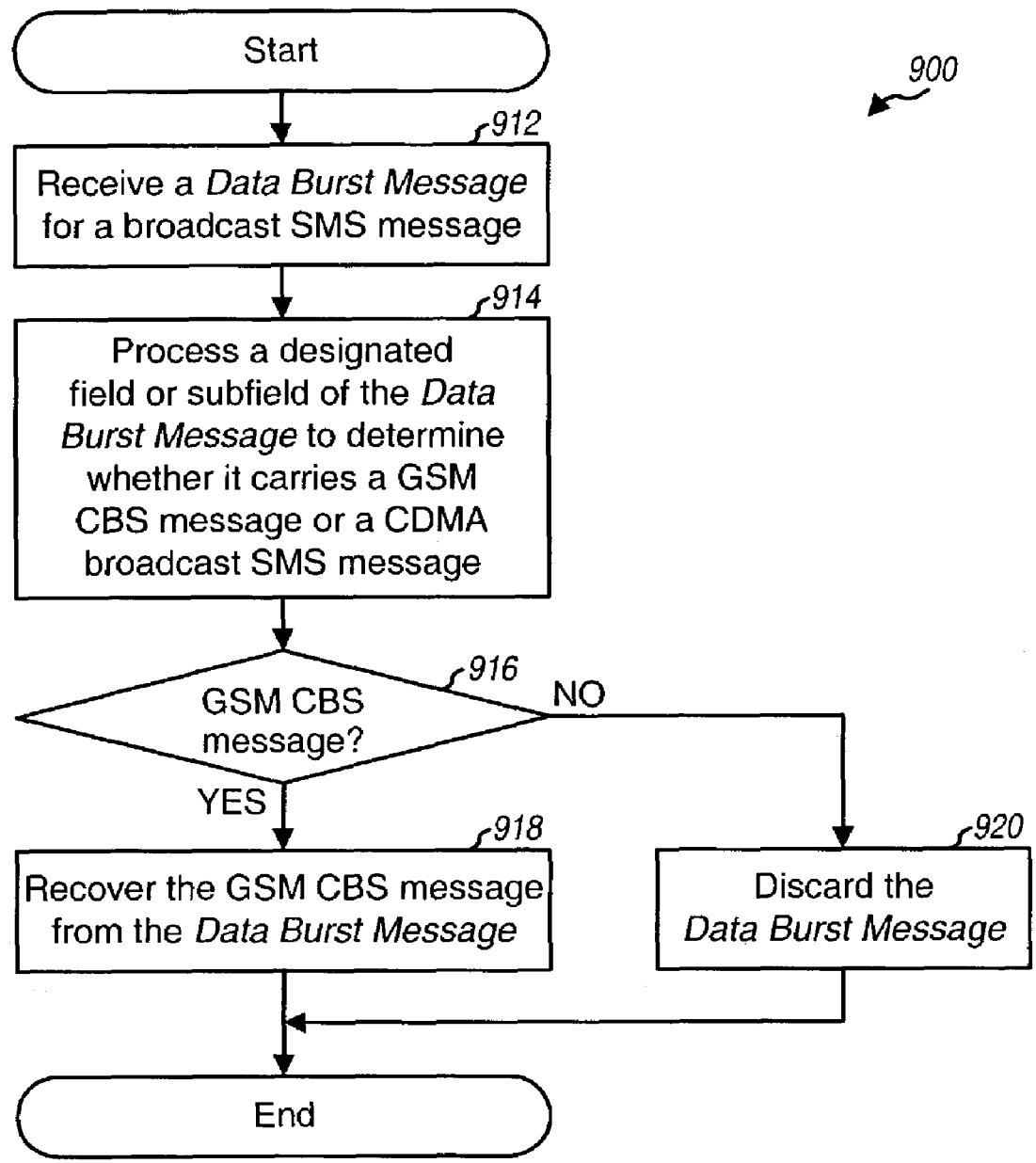
FIG. 9 shows a process for receiving GSM CBS messages.

FIG. 9 is a flow diagram of an embodiment of a process 900 performed by a terminal for receiving GSM CBS messages. Process 900 may be performed for each broadcast SMS message received by the terminal.

Initially, a Data Burst Message is received by the terminal (step 912). A designated field or subfield of this message is then processed to determine whether it carries a GSM CBS message or a CDMA broadcast SMS message (step 914). The specific field or subfield to process is dependent on the particular scheme used to encapsulate the GSM CBS message. For example, the Address Length field is processed for the first scheme, the Broadcast Type subfield of the Address field is processed for the second scheme, the Burst Type field is processed for the third scheme, and the Language field of the BC_ADDR in the Address field is processed for the fourth scheme, as described above and shown in FIGS. 3 through 6, respectively.

A determination is then made whether or not the Data Burst Message carries a GSM CBS message (step 916). If the answer is no, then the message is discarded (step 920). Otherwise, the Data Burst Message is further processed to recover the (Transport Layer) SMS Broadcast Message, which is further processed to recover the (Teleservice Layer) SMS Deliver Message, which is further processed to recover the GSM CBS message (step 918). In either case, the process then terminated as to this Data Burst Message.

Step 918 may be performed by different entities for multiple layers in the terminal. The entity for each layer may examine the appropriate field in its received message to determine whether a GSM CBS message or a CDMA broadcast SMS message is carried. The outcome of this determination may dictate the processing to be performed on the message. The SMS Transport Layer entity may examine the Msg_Encoding field in the User Data subparameter of the SMS Deliver Message, and the SMS Teleservice Layer entity may examine the Category field in the Service Category parameter of the SMS Broadcast Message.

Figure 10:
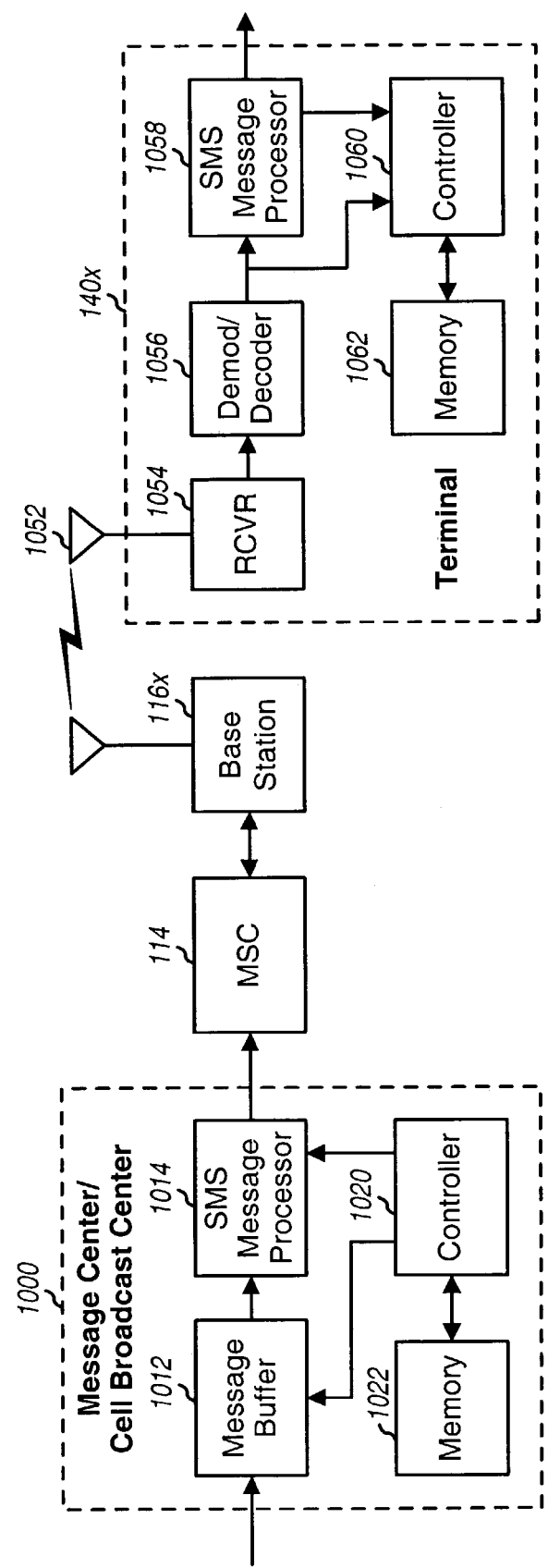
FIG. 10 is a block diagram of a message/cell broadcast center and a terminal.

FIG. 10 is a block diagram of an embodiment of a message center/cell broadcast center 1000 and a terminal 140x. In this embodiment, message center/ cell broadcast center 1000 may be implemented in an ANSI-41 message center, a GSM cell broadcast center, or an MSC.

Message center/cell broadcast center 1000 receives data to be broadcasted for CBS service. The data is temporarily stored in a message buffer 1012 and is thereafter retrieved as needed by an SMS message processor 1014 for encapsulation into CDMA SMS messages suitable for transmission over a CDMA air interface. The message encapsulation may be performed as described above.

The CDMA SMS messages with the encapsulated GSM CBS messages are either provided to MSC 114 (for the configuration shown in FIG. 7A, and as shown in FIG. 10) or generated by the MSC (for the configuration shown in FIG. 7B). In either case, the MSC forwards the CDMA SMS messages to a designated base station 116x, which further processes the received messages and includes them in a modulated signal transmitted to the terminals within its coverage area.

Within message center/cell broadcast center 1000, a controller 1020 controls the encapsulation of GSM CBS messages using any one of the schemes described above. A memory unit 1022 provides storage for program codes and data used by controller 1020.

FIG. 10 also shows an embodiment of terminal 140x. The modulated signal transmitted from base station 116x is received by an antenna 1052 and provided to a receiver unit (RCVR) 1054. Receiver unit 1054 conditions (e.g., filters, amplifies, and 0frequency downconverts) the received signal and further digitizes the conditioned signal to provide samples.

A demodulator (Demod)/decoder 1056 then demodulates the samples in a manner determined by the specific CDMA air interface used by the network (e.g., IS-2000, W-CDMA, or IS-95). The demodulated data is then decoded to provide decoded data, which includes the Data Burst Messages sent in the modulated signal. An SMS message processor 1058 then processes each Data Burst Message to determine whether it carries a GSM CBS message or a CDMA broadcast SMS message. SMS message processor 1058 may examine a designated field or subfield of the Data Burst Messages to make this determination. The Data Burst Messages may further be processed to recover any GSM CBS messages carried thereon.

A controller 1060 directs the operation of the units within terminal 140x. For example, controller 1060 may direct SMS message processor 1058 to examine a particular field or subfield for each received Data Burst Message. A memory unit 1062 provides storage for program codes and data used by controller 1060.

FIG. 10 shows a specific embodiment of message center/cell broadcast center 1000 and terminal 140x. Other embodiments are also possible and are within the scope of the invention. For message center/cell broadcast center 1000, SMS message processor 1014 may also be implemented within controller 1020 or within some other processing unit. Similarly, for terminal 140x, SMS message processor 1058 may be implemented within controller 1060 or within some other processing unit.

The techniques described herein for sending GSM CBS messages in CDMA systems may be implemented by various means. For example, these techniques may be implemented in hardware, software, or a combination thereof. For a hardware implementation, the elements used to implement the techniques at the network side and at the terminal may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in a memory unit (e.g., memory units 1022 and 1062 in FIG. 10) and executed by a processor (e.g., controllers 1020 and 1060). The memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for receiving Cell Broadcast Short Message Service (CBS) messages in a CDMA communication system, comprising:

receiving a CDMA message having encapsulated therein a broadcast SMS message;

processing a designated field or subfield of the CDMA message to determine whether the broadcast SMS message is a GSM CBS message or a CDMA broadcast SMS message; and recovering the GSM CBS message from the CDMA message if the GSM CBS message is encapsulated in the CDMA message.

2. The method of claim 1, wherein the designated field is an address length field of the CDMA message, and wherein the GSM CBS message and CDMA broadcast SMS message are distinguished by different values for the address length field.

3. The method of claim 2, wherein a header portion of the GSM CBS message is carried in an address field of the CDMA message.

4. The method of claim 1, wherein the designated subfield is a broadcast type subfield in an address field of the CDMA message, and wherein the GSM CBS message and CDMA broadcast SMS message are distinguished by different values for the broadcast type subfield.

5. The method of claim 1, wherein the designated field is a burst type field of the CDMA message, and wherein the GSM CBS message and CDMA broadcast SMS message are distinguished by different values for the burst type field.

6. The method of claim 1, wherein the designated field is a language field for an address field of the CDMA message, and wherein the GSM CBS message and CDMA broadcast SMS message are distinguished by different ranges of value for the language field.

7. The method of claim 6, wherein a partial header portion of the GSM CBS message is carried in the address field of the CDMA message.

8. The method of claim 6, wherein a serial number, a message identifier, and a page parameter of the GSM CBS message are carried in the address field of the CDMA message.

9. The method of claim 1, wherein the CDMA message is a Data Burst Message in the CDMA system.

10. The method of claim 9, wherein the GSM CBS message is encapsulated in an SMS Deliver Message that is further encapsulated in an SMS Broadcast Message that is then encapsulated in the Data Burst Message.

11. The method of claim 10, wherein a message encoding field of the SMS Deliver Message includes a value indicative of the GSM CBS message being carried in the SMS Deliver Message.

12. The method of claim 10, wherein a service category parameter of the SMS Broadcast Message includes a value indicative of the GSM CBS message being carried in the SMS Broadcast Message.

13. The method of claim 1, wherein the CDMA system is a cdma2000 system.

14. A method for processing Cell Broadcast Short Message Service (CBS) messages for transmission in a CDMA communication system, comprising:
    forming a Data Burst Message to carry a GSM CBS message;
    setting a designated field or subfield of the Data Burst Message to a value indicative of the GSM CBS message being carried in the Data Burst Message; and
    broadcasting the Data Burst Message carrying the GSM CBS message to terminals.

15. The method of claim 14, wherein the GSM CBS message is encapsulated in an SMS Deliver Message that is further encapsulated in an SMS Broadcast Message that is then encapsulated in the Data Burst Message.

16. A method for processing Cell Broadcast Short Message Service (CBS) messages for transmission in a CDMA communication system, comprising:
    encapsulating a GSM CBS message in a CDMA SMS Deliver Message;
    setting a message encoding field of the SMS Deliver Message to a value indicative of the GSM CBS message being carried in the SMS Deliver Message;
    encapsulating the SMS Deliver Message in a CDMA SMS Broadcast Message; and
    setting a service category parameter of the SMS Broadcast Message to a value indicative of the GSM CBS message being carried in the SMS Broadcast Message.

17. The method of claim 16, wherein the SMS Broadcast Message is encapsulated in a Data Burst Message, and wherein a designated field or subfield of the Data Burst Message is set to a value indicative of the GSM CBS message being carried in the Data Burst Message.

18. A terminaoperative to receive Cell Broadcast Short Message Service (CBS) messages in a CDMA communication system, comprising:
    a demodulator/decoder operative to process data samples and provide a CDMA message having encapsulated therein a broadcast SMS message; and
    a message processor operative to process a designated field or subfield of the CDMA message to determine whether the broadcast SMS message is a GSM CBS message or a CDMA broadcast SMS message, and to recover the GSM CBS message from the CDMA message if the GSM CBS message is encapsulated in the CDMA message.

19. An apparatus operative to receive Cell Broadcast Short Message Service (CBS) messages from a CDMA communication system, comprising:
    means for receiving a CDMA message having encapsulated therein a broadcast SMS message;
    means for processing a designated field or subfield of the CDMA message to determine whether the broadcast SMS message is a GSM CBS message or a CDMA broadcast SMS message; and
    means for recovering the GSM CBS message from the CDMA message if the GSM CBS message is encapsulated in the CDMA message.

20. A network entity operative to process Cell Broadcast Short Message Service (CBS) messages for transmission in a CDMA communication system, comprising:
    a buffer receive data for a GSM CBS message; and
    a message processor encapsulate the GSM CBS message in a CDMA SMS Deliver Message and to further encapsulate the SMS Deliver Message in a CDMA SMS Broadcast Message, wherein a message encoding field of the SMS Deliver Message and a service category parameter of the SMS Broadcast Message are set to values indicative of the OSM CBS message being carried in the SMS Deliver Message and the SMS Broadcast Message.

* * * * *